UNITED STATES PATENT OFFICE.

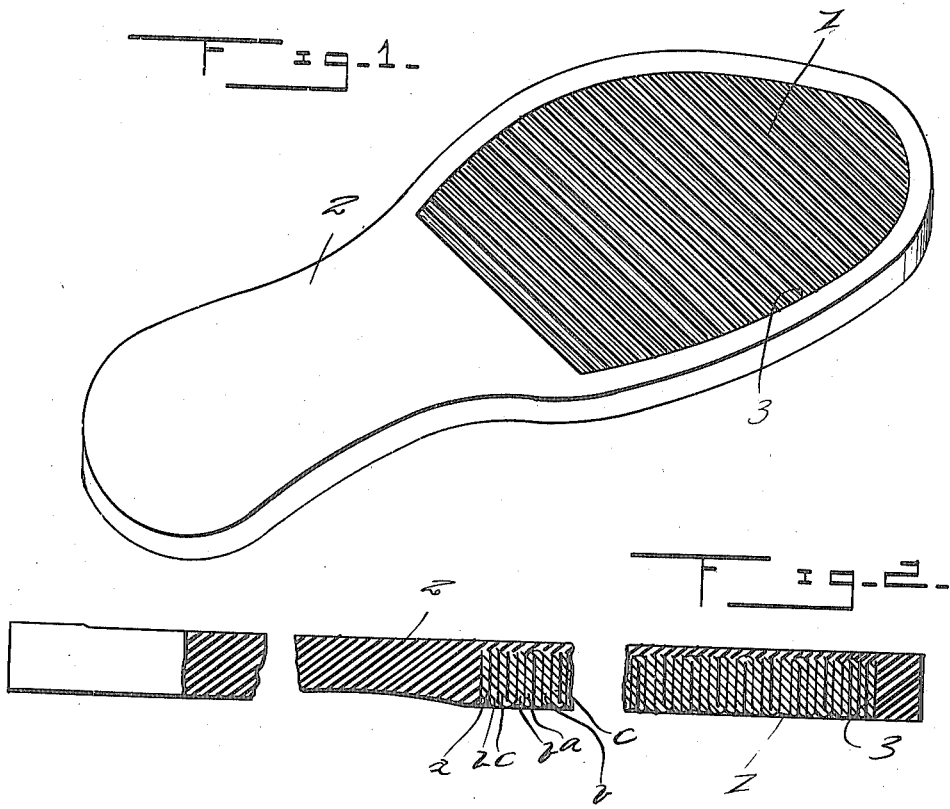

LEON F. MONTGOMERY, OF FORT RECOVERY, OHIO, ASSIGNOR OF ONE-HALF TO
J. E. GROSJEAN, OF LIMA, OHIO.

TREAD AND PROCESS OF MAKING THE SAME.

1,249,292.    Specification of Letters Patent.    Patented Dec. 4, 1917.

Application filed March 13, 1917. Serial No. 154,496.

*To all whom it may concern:*

Be it known that LEON F. MONTGOMERY, a citizen of the United States, residing at Fort Recovery, in the county of Mercer and State of Ohio, has invented certain new and useful Improvements in Treads, and Processes of Making the Same; and I do hereby declare the following to be a full, clear, and exact description of the invention, such as will enable others skilled in the art to which it appertains to make and use the same.

This invention relates to new and useful improvements in treads, and the principal object of the invention is to provide a tread which is durable, cheap to manufacture and presents an anti-slipping surface, thus insuring safety.

A further object of the invention is to provide a tread adapted to be incorporated in shoe soles, mats, stair treads and the like, which tread presents to the tread surface the ends of the threads of a fabric, thus insuring a device having the maximum anti-slipping qualities, and also the maximum efficiency in wear.

A further object of the invention is to provide a method of utilizing waste materials thus reducing the cost of production of the tread to a minimum through the use of waste materials and the reduction of labor incident to the manufacture of the device.

A further object of the invention resides in the provision of a means for utilizing worn out tire casings by the removal of the tread portion so as to use only the body of the tire consisting of layers of fabric and rubber vulcanized together to produce a unitary structure which is capable of long duration, and is highly efficient as an anti-slipping element.

With the foregoing and other objects in view, the invention consists in the novel combination and arrangement of parts which will be fully set forth in the following specification and accompanying drawings, in which:—

Figure 1 is a perspective view of the bottom of a shoe sole, showing this improved tread incorporated therein;

Fig. 2 is a fragmentary longitudinal sectional view through Fig. 1; and

Fig. 3 is a perspective view of a fragment of the tread, showing the same in the process of preparation for use.

In the manufacture of treads of the nature of this invention, a worn out tire casing is used and the rubber tread is stripped from the casing so as to leave only the several plies of fabric and rubber forming the body of the tire. The beads are also removed and the material thus prepared is cut into the desired shapes and then scored transversely on opposite sides and in such a manner that the scoring on one side comes intermediate the scoring on the opposite side. The material is scored preferably through to the ply on the opposite side from which the scoring is made thus enabling the same to be freely bent as illustrated in Fig. 3. After the scoring process the several narrow strips formed thereby are folded in the manner shown in the drawings, so that the threads of the fabric present their ends to opposite side faces of the tread. The adjacent faces of the strips have a suitable rubber cement applied thereto so as to firmly secure the whole in proper position, and after the tread has been formed in this way, the same may be inserted in the shoe soles, mats or stair treads and the like, and vulcanized in place, thus insuring a unitary structure presenting the ends of the threads of the fabric to wear and thereby increasing the wearing qualities of the device to a maximum.

It will be understood that the tread may be built up of sheets of rubber and fabric which are vulcanized together, thus making the device of new stock rather than worn out tires, but of course a structure of this kind would increase the cost of production owing to the fact that the layers would first have to be vulcanized and then scored.

From the foregoing, it will be seen that a particularly simple and efficient process for producing treads for shoe soles, mats, stair treads and the like is provided which reduces the cost of production to a minimum and produces a highly efficient tread having the maximum wearing qualities.

In the use of the tread in a shoe sole the tread is designated by the numeral 1 and constructed in the manner previously set forth and is embedded in the sole 2 as clearly shown in the drawings. The sole is recessed as at 3 to receive the tread which is first cut to the desired shape and after having been put in place the whole is vulcanized for securely attaching the tread and avoiding any possibility of the parts becoming loose.

As illustrated in the drawings, the tread is formed of a three ply fabric, the first ply being designated by the character $a$, the second by the character $b$, and the third by the character $c$. As shown the strips $a$ and $b$ are scored transversely at spaced intervals, while the strips $b$ and $c$ are scored transversely at intervals intermediate the scored portions of the strips $a$ and $b$. In this way it will be seen that the strips $a$ and $b$ form hinges on which the tread element is folded.

From the foregoing it will be apparent that a particularly simply constructed and cheaply manufactured tread is provided for use in connection with shoe soles, mats, stair treads and the like, which tread is particularly cheap to manufacture owing to the fact that it is capable of utilizing old worn out tire casings and other similar products which would ordinarily be useless.

While in the foregoing there has been shown and described the preferred embodiment of this invention, it is to be understood that such changes may be made in the combination and arrangement of parts as will fall within the spirit and scope of the appended claims.

What is claimed is:—

1. A tread consisting of a plurality of layers of fabric and rubber scored transversely and folded on the scores to bring fabric ends into position to produce a wear surface.

2. The hereindescribed process of producing treads consisting in the scoring of a laminated body, the folding of the strips formed by the scores so that their adjacent faces lie against each other and the cementing of the whole together to form a tread.

3. The hereindescribed method of producing a tread consisting in the production of a laminated body, the scoring of said body transversely on opposite side faces with the scores in alternate relation, and the folding of the body on the scores to bring the edges of said body into position to present a wear surface.

In testimony whereof I affix my signature in presence of two witnesses.

LEON F. MONTGOMERY.

Witnesses:
   H. B. PLAGEMANN,
   Mrs. MARGARET HOOPER.